Patented Sept. 7, 1948

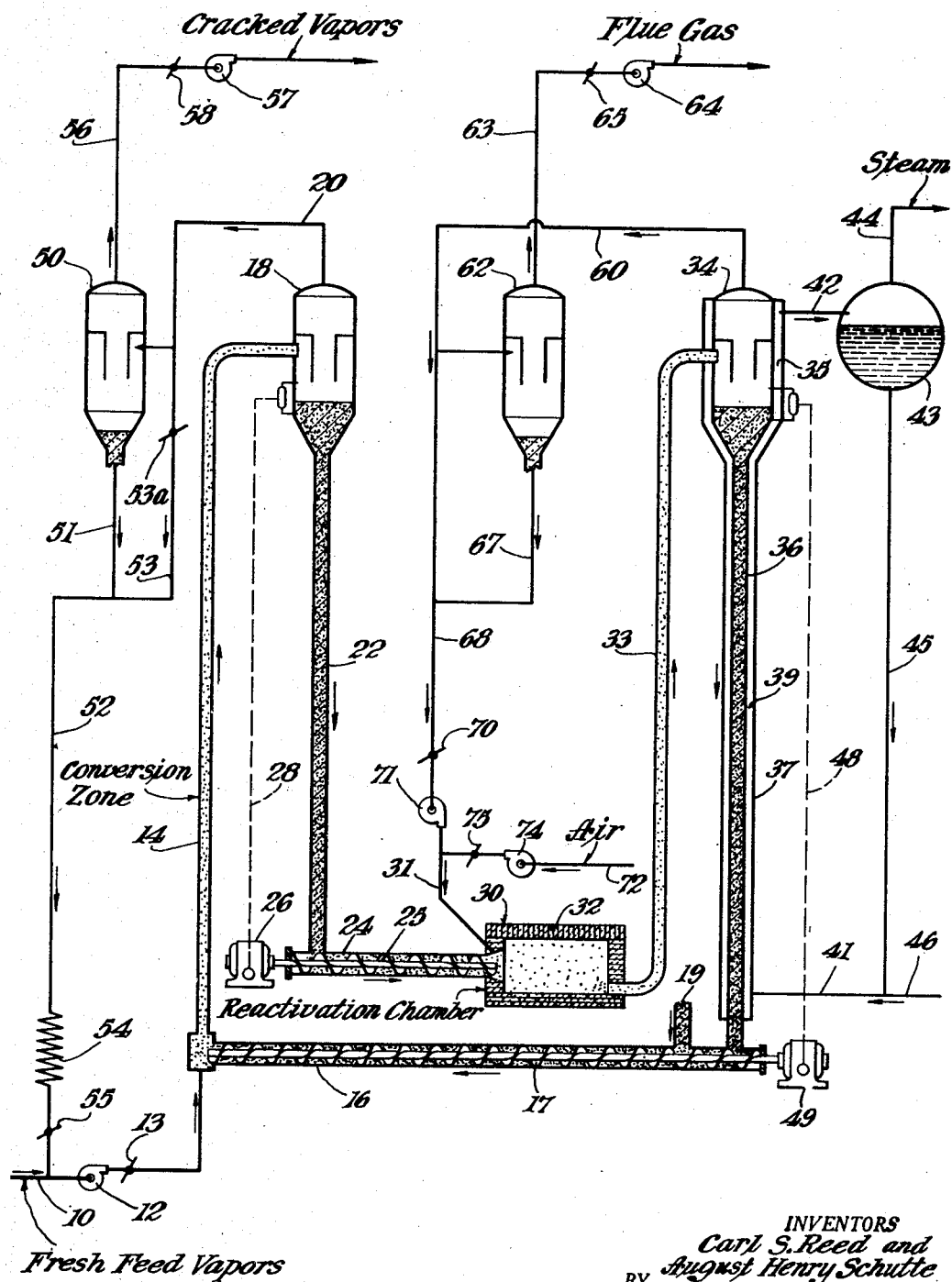

2,448,553

UNITED STATES PATENT OFFICE 2,448,553

REISSUED
JUN 1 3 1950
RE 23241

PROCESS FOR RECYCLING CATALYST FINES IN A CATALYST CONVERSION SYSTEM

August Henry Schutte, Hastings on Hudson, and Carl S. Reed, New York, N. Y., assignors to The Lummus Company, New York, N. Y., a corporation of Delaware Original application January 29, 1941, Serial No. 376,486. Divided and this application April 9, 1946, Serial No. 660,684

8 Claims. (Cl. 196—52)

This invention relates to improvements in apparatus and process for effecting chemical reactions by catalysis. This application is a division of our copending application, Serial No. 376,486, filed January 29, 1941, for "Catalysis."

In the field of hydrocarbon conversion by catalysis, it has been customary to use a catalyst in lump or similar form positioned in a suitable reaction chamber. As vapors are passed over the catalyst for reaction, the catalyst rapidly becomes fouled and is rendered inefficient. It is usually necessary to take the chamber off stream after a relatively short period to revive the catalyst by removing the carbon and other materials deposited thereon during the conversion reaction. Ordinarily, several duplicate catalyst chambers are provided for continuous conversion of vapors; but each chamber has only a limited "on stream" period during which it is active, after which time the reactivation must take place. As the catalytic conversion is usually endothermic and the reactivation exothermic, temperature conditions in a particular chamber cannot be kept stable, and the great heat loss which takes place or the expensive heat recovery systems necessitated as well as the multiplicity of chambers required for continuous operation have made the use of this process very costly.

The principal object of our invention is to provide a closed cycle catalytic reaction system in which a powdered catalyst is continuously passed through a reaction zone in intimate suspension in the vapors to be reacted and then, after separation from the vaporous reactants, continuously passed through a reactivation zone and thence recycled for admixture with further feed, each zone being continuously maintained at its optimum temperature and pressure conditions whereby the initial cost as well as the operating cost of the catalytic reaction may be reduced.

A more specific object of our invention is to provide an improved control for a continuous powdered catalyst reaction cycle in which the pressures in the various parts of the system are independently maintained by sufficient heads of powdered catalyst to prevent contamination of vapors or loss of reacted products without requiring complicated and expensive mechanical seals or valves.

Further objects and advantages of the invention will be apparent from the following description of a preferred form of embodiment thereof taken in connection with the attached drawing, which is a diagrammatic view of a suitable flow sheet.

In accordance with our invention, we provide a complete closed continuous cycle process for effecting a catalytic reaction with a powdered catalyst and thereafter reactivating the catalyst and then returning it to be admixed with fresh feed. Such process has primary value and importance in the conversion of hydrocarbons and will be specifically described in connection therewith although it will be appreciated that the process can be used equally as well with other reactants.

More specifically, fresh feed to be reacted, vapors which have been previously heated in some manner, is introduced at 10 under pressure of blower 12 and under control of damper or valve 13 and is discharged into the conversion zone 14. At the same time, a suitable powdered catalyst is fed into the conversion zone at a predetermined rate by the conveyor 16, which may have a suitable feeding means 17.

The conversion zone 14 may be of any desired and satisfactory type but is preferably an elongated tube of such length and diameter as to assure a sufficient time of reaction during the passage therethrough of the catalyst and vaporous reactants. Such zone may be externally heated, if found desirable, and should be sufficiently insulated such that the temperature drop of the relatively hot vapors and catalyst will not be objectionable during their passage therethrough.

The catalyst is preferably in a powdered form and may be ground as fine as 100–400 mesh, in which condition its area of contact is far greater per pound of catalyst than in the usual lump form. In such form, it will commingle very well with the vapors and will assist in establishing a high conversion within a short time or travel.

After removal from the conversion zone, the reacted vapors and catalyst are separated by the separator 18, which may be of the "cyclone" type. The reacted vapors are withdrawn overhead from the separator as by conduit 20, and the separated catalyst is removed through the vertical conduit 22. Conduit 22 is connected to conduit 24, through which the catalyst is passed by means of a feed means 25 under control of motor 26.

The conduit 22 is relatively long and of such size that, if it is kept full of catalyst, there is no likelihood of any vapor loss therethrough. A powdered catalyst will settle to such an extent that it is possible to have a column of catalyst within reasonable limits of length which will have a pressure drop for small flows of vapors that will be substantially equal to the desired differential of pressure between the separator 18 and the lower end of conduit 22. The motor 26, which removes the catalyst from the conduit 22, is operated at such a speed that the conduit 22 will be kept full of catalyst. A level control diagrammatically shown at 28 may be used for this purpose.

The catalyst which has been used in the foregoing reaction is now passed from conduit 24 into the reactivation chamber 30 together with air and flue gas from line 31, which air serves to burn off the carbon and other catalyst-fouling contaminants. This reactivation is usually an exothermic reaction, and the chamber 30 may be suitably lined with refractory brick 32 to reduce heat loss to a minimum. Such practice assures removal of the powdered catalyst and the products of combustion, which comprise flue gases primarily, at a high temperature through conduit 33 into the flue gas separator and heat exchanger 34.

Like separator 18, separator 34 may also be of the "cyclone" type and has a similar function in that it separates the reactivated catalyst from the vapors. The vapors (which are the products of combustion) are withdrawn through line 60, and the catalyst settles in vertical conduit 36 which is of sufficient length so that the vapors cannot escape through the body of catalyst contained therein. Conduit 36 is provided with a secondary conduit or jacket 37 forming a liquid chamber 39, through which a heat exchanging medium such as water can be circulated; since the catalyst is very hot, substantial amounts of steam can be produced.

If desired, the water chamber 39 may be interconnected by the line 42 with the boiler 43, from which steam may be removed at 44. The boiler 43 is preferably provided with the downcomer 45, which is interconnected with the lower portion of the water chamber 39 by the line 41. Provision is made for the introduction of make-up water through the line 46.

The catalyst is maintained at the desired height in the conduit 36 so that a loss of vapor through the conduit 36 is prevented. As in the former case, this object may be accomplished by means of a level control 48, which controls motor 49, which in turn operates the initial feed means 17. It will also be noted that the heat transfer from the extended column of hot catalyst is sufficiently great to produce a substantial quantity of steam which can be used for power purposes. The steam in turn tends to maintain a uniform temperature in conduit 36.

It will be thus seen that the system is pressure tight by virtue of the two vertical columns of catalyst which completely isolate the conversion zone and the reactivation zone from each other. Furthermore, the catalyst moves continuously first through an endothermic conversion zone and then an exothermic reactivation zone, each of which may be maintained at its optimum temperature and pressure. If it is desired to alter the flow of catalyst, this may be readily accomplished by varying the speed of either or both motors or by means of a variable speed drive placed between one motor and its driven feed means. Fresh catalyst may be introduced at 19 and is preferably passed through a similar vertical column to automatically provide a pressure seal.

A part of the vapors removed from the separator 18 after passage through the conversion zone 14 is usually recirculated, the recycle ratio being dependent upon the rate of conversion. This recirculation may be accomplished by passing a portion of the vapors from line 20 through line 53 and line 52 to the fresh feed vapor line 10.

If the vapors in line 20 carry too much catalyst in suspension, that portion not recirculated may be passed through a secondary separator 50, which may also be of the "cyclone" type. The small amount of catalyst separated therein may also be recirculated with the vapors through line 52; in some cases this procedure may have a beneficial effect. Suitable dampers or valves 53a and 55 may be provided to regulate the amount of material which is recirculated past separator 50. A heater 54 may be provided to control the heat content of the recirculated vapors. Their quantity and quality may be accurately controlled by regulation of the speed of the respective motors 26 and 49 heretofore mentioned and by control of the temperature in conversion zone 14 and heater 54 and also by control of the temperature of the reactivation system. Highly accurate production control is thus obtainable at all times.

As illustrated in the drawing, the cracked vapors are removed from separator 50 through line 56 by means of blower 57, a damper 58 being inserted ahead of the blower.

In a similar manner, a more complete separation of catalyst from the flue gases or products of combustion may be accomplished by passing the gases in line 60 to the secondary flue gas separator 62, from which the catalyst-free flue gas is withdrawn through line 63 by blower 64 under control of damper 65.

The small amount of catalyst which may be separated out of the flue gases in this secondary separation may be returned to the reactivation zone through line 67. At the same time, some of the flue gas is conducted through line 68, under control of damper 70 and by means of blower 71, into line 31, into which air is forced from supply line 72 by blower 74. A damper or valve 75 controls the amount of air supplied.

It will be appreciated that some admixture of flue gas with the air is usually desirable to control the exothermic reaction in chamber 30 as the introduction of pure air may cause too rapid a generation of heat therein. Dampers 70 and 75 afford means for accurate adjustment.

It will be appreciated that one of the most important features of the invention is the continuity of flow of all materials, which continuity makes possible the establishment of relatively constant temperature conditions in the respective zones in which the reactions are carried out. While in one zone it may be necessary to continuously add heat, it is possible in the other zone to continuously and simultaneously remove heat which can be applied to useful purposes so that heat balance will show a minimum fluctuation of heat transfer and a minimum heat loss.

A second important feature is the flexibility of the apparatus in that, although different reaction zones are isolated solely by the natural compactness of the catalyst, it is possible to increase or decrease the rate of flow of catalyst without destroying the effective height of catalyst in the column so that no mechanical seals are necessary to establish the relatively different pressure-tight zones. Furthermore, it is possible to obtain a differential of pressure either at low or high absolute pressures so that the apparatus is useful for various catalytic reactions including the conversion of hydrocarbons.

A third feature is the simplicity of obtaining a substantial separation of the gaseous from the granular materials without great heat loss and the recirculation of the small portions of the catalyst incompletely removed in the first separation stage without deleterious result. The system is inexpensive and simple and has the minimum number of operating parts to become out of order or require adjustment.

Although we have described a preferred form of embodiment of our invention, it will be apparent that modifications may be made thereto; therefore, only such limitations as appear in the claims appended hereinafter should be applied.

We claim:

1. In a catalytic hydrocarbon system wherein hydrocarbon vapors pass through a conversion zone and commingle in said conversion zone with finely divided catalyst in turbulent, suspended phase and thence to a first catalyst separating zone wherein the bulk of the spent catalyst is separated from the effluent vapors of the conversion zone and said spent catalyst is then introduced into a regeneration zone with an oxidizing gas which flows therethrough at such a velocity as to maintain the catalyst in a turbulent suspended phase, and wherein the bulk of regenerated catalyst is then separated from the effluent gases of the regeneration zone in a second catalyst separating zone, the regenerated catalyst being returned in a closed circuit to said conversion zone, the improvement which comprises separately separating catalyst fines carried by the effluent vapors of the conversion zone and by the effluent gases of the regeneration zone, respectively, and directly injecting said fines back into the respective zones from which they were obtained.

2. In a catalytic hydrocarbon conversion system as claimed in claim 1 in which the major part of the effluent gases or vapors are cyclone separated from the fines and the balance of vapors or gases are recycled into the respective zones with the fines.

3. In a catalytic hydrocarbon conversion system as claimed in claim 2 in which the fines and associated vapors are reheated before entering the conversion zone and are injected into the entrance portion of said zone.

4. In a catalytic hydrocarbon conversion system as claimed in claim 2 in which the fines and associated gases are combined with the oxidizing gas before entering the regenerating zone to control the temperature thereof.

5. In a catalytic conversion system of a type wherein a gas or vapor passes through a contacting zone into which finely divided catalyst is continuously admitted and commingles in said zone with finely divided catalyst in turbulent, suspended phase under reaction conditions and wherein most of the catalyst is then cyclone separated from the effluent gases or vapors and fines in a separating zone and the residual catalyst fines are removed with said effluent gases or vapors, the method of conducting the reaction which comprises impelling a portion of the residual catalyst fines leaving the cyclone separation step directly into the contacting zone adjacent the entrance of the first mentioned catalyst together with a portion of said effluent gases or vapors whereby the catalyst repeatedly passes through the contacting zone.

6. A catalytic conversion system as claimed in claim 5 in which the contacting zone is a regeneration zone and a part of the effluent gases carry the fines into the regeneration zone.

7. A catalytic conversion system as claimed in claim 5 in which the contacting zone is a conversion zone and the vapors which are returned with the fines are reheated before entering the conversion zone.

8. In a catalytic conversion system of the type wherein a gas or vapor passes through a contacting zone and commingles in said zone with finely divided catalyst in turbulent suspended phase under reaction conditions and wherein the effluent passes through an enlarged separating zone in which most of the catalyst is separated from the effluent gases or vapors and the residual catalyst is removed with said effluent gases or vapors, the method of conducting the reaction which comprises cyclone separating finely divided catalyst from a part of said effluent gases or vapors and positively impelling a portion of said effluent gases or vapors with cyclone separated catalyst directly into the contacting zone whereby some of the products of the reaction will be subjected to repeated passage through the contacting zone.

AUGUST HENRY SCHUTTE.
CARL S. REED.

REFERENCES CITED

The following references are of record in the file of this patent:

UNITED STATES PATENTS

| Number | Name | Date |
|---|---|---|
| 2,231,424 | Huppke | Feb. 11, 1941 |
| 2,253,486 | Belchetz | Aug. 19, 1941 |
| 2,273,075 | Weems | Feb. 17, 1942 |
| 2,282,855 | Egloff | May 12, 1942 |
| 2,289,329 | Prickett | July 7, 1942 |
| 2,296,722 | Marancik et al. | Sept. 22, 1942 |
| 2,304,827 | Jewell | Dec. 15, 1942 |
| 2,305,004 | Hemminger | Dec. 15, 1942 |
| 2,311,564 | Munday | Feb. 16, 1943 |
| 2,311,978 | Conn | Feb. 23, 1943 |
| 2,325,516 | Holt et al. | July 27, 1943 |
| 2,345,487 | Liedholm | Mar. 28, 1944 |
| 2,360,787 | Murphree et al. | Oct. 17, 1944 |
| 2,377,512 | Page | June 5, 1945 |
| 2,377,657 | Watts | June 5, 1945 |
| 2,377,935 | Gunness | June 12, 1945 |
| 2,378,542 | Edmister | June 19, 1945 |
| 2,379,408 | Arveson | July 3, 1945 |
| 2,385,216 | Marancik et al. | Sept. 18, 1945 |
| 2,392,957 | Thomas | Jan. 15, 1946 |
| 2,417,867 | Fulton et al. | Mar. 25, 1947 |